(12) United States Patent
Murata

(10) Patent No.: US 12,213,086 B2
(45) Date of Patent: Jan. 28, 2025

(54) COMMUNICATION SYSTEM AND INFORMATION TERMINAL DEVICE

(71) Applicant: Alps Alpine Co., Ltd., Tokyo (JP)

(72) Inventor: Shinji Murata, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 418 days.

(21) Appl. No.: 17/563,119

(22) Filed: Dec. 28, 2021

(65) Prior Publication Data
US 2022/0124644 A1    Apr. 21, 2022

Related U.S. Application Data

(63) Continuation of application No. PCT/JP2020/011400, filed on Mar. 16, 2020.

(30) Foreign Application Priority Data

Aug. 2, 2019    (JP) .................................. 2019-143048

(51) Int. Cl.
*H04W 52/38*    (2009.01)
*G06K 19/07*    (2006.01)
(Continued)

(52) U.S. Cl.
CPC ...... *H04W 52/386* (2013.01); *G06K 19/0723* (2013.01); *G06K 19/07773* (2013.01); *H04B 1/44* (2013.01)

(58) Field of Classification Search
CPC ............ H04W 52/386; G06K 19/0723; G06K 19/07773; G06K 7/10079; G06K 7/10376;
(Continued)

(56) References Cited

U.S. PATENT DOCUMENTS

| | | | | |
|---|---|---|---|---|
| 5,461,385 A | * | 10/1995 | Armstrong | ............. G08C 17/02 340/447 |
| 6,720,866 B1 | * | 4/2004 | Sorrells | .............. G06K 19/0723 340/10.41 |

(Continued)

FOREIGN PATENT DOCUMENTS

| | | |
|---|---|---|
| JP | 2016-093873 A | 5/2016 |
| JP | 2018-517981 A | 7/2018 |

OTHER PUBLICATIONS

International Search Report for corresponding International Application No. PCT/JP2020/011400 dated May 26, 2020 with English translation (6 Pages).

*Primary Examiner* — Jinsong Hu
*Assistant Examiner* — Rui M Hu
(74) *Attorney, Agent, or Firm* — Harness, Dickey & Pierce, P.L.C.

(57) ABSTRACT

A communication system includes a master device and a slave device. The master device can transmit a signal to a slave device. The slave device includes an antenna, a sensor unit, an RFID unit, a changeover switch that connects the antenna to one of the sensor unit and the RFID unit, and a switching circuit that switches the changeover switch based on a switching signal transmitted from the master device. When the antenna in the slave device receives the switching signal from the master device, the switching circuit switches the changeover switch in the slave device from a state in which the antenna and the sensor unit are connected to a state in which the antenna and the RFID unit are connected, in accordance with the switching signal.

3 Claims, 6 Drawing Sheets

(51) Int. Cl.
*G06K 19/077* (2006.01)
*H04B 1/44* (2006.01)

(58) Field of Classification Search
CPC ......... G06K 19/0709; G06K 19/07766; G06K 19/0716; G06K 19/0775; H04B 1/44; H04B 1/59; H04L 67/12; G01L 5/00
See application file for complete search history.

(56) References Cited

U.S. PATENT DOCUMENTS

| | | | | |
|---|---|---|---|---|
| 7,158,009 | B2* | 1/2007 | Watanabe | G06K 19/0701 |
| | | | | 235/494 |
| 8,941,493 | B2* | 1/2015 | Foster | G05B 19/048 |
| | | | | 340/10.5 |
| 9,959,739 | B1* | 5/2018 | Lui | A61F 13/42 |
| 10,243,410 | B2* | 3/2019 | Dalwadi | G06K 19/0712 |
| 10,461,973 | B2 | 10/2019 | Nikunen et al. | |
| 2005/0024187 | A1* | 2/2005 | Kranz | G06K 19/0712 |
| | | | | 340/10.33 |
| 2007/0096882 | A1* | 5/2007 | Bandy | G06K 19/0723 |
| | | | | 340/572.3 |
| 2007/0175995 | A1* | 8/2007 | Maniwa | H04B 5/77 |
| | | | | 235/451 |
| 2007/0216531 | A1* | 9/2007 | Lee | G06K 17/00 |
| | | | | 340/572.1 |
| 2007/0222590 | A1* | 9/2007 | Posamentier | G01K 1/024 |
| | | | | 340/572.1 |
| 2008/0018433 | A1* | 1/2008 | Pitt-Pladdy | H04B 5/77 |
| | | | | 340/10.4 |
| 2009/0033479 | A1* | 2/2009 | Tanemura | B60C 23/0413 |
| | | | | 340/447 |
| 2009/0224890 | A1* | 9/2009 | Kim | G06K 19/0705 |
| | | | | 340/10.33 |
| 2009/0237218 | A1* | 9/2009 | Kim | H04B 5/72 |
| | | | | 455/75 |
| 2009/0284353 | A1* | 11/2009 | Bayley | G06K 19/0723 |
| | | | | 340/10.1 |
| 2010/0123583 | A1* | 5/2010 | Bommer | G06K 19/0723 |
| | | | | 340/572.7 |
| 2010/0207754 | A1* | 8/2010 | Shostak | B60C 23/0433 |
| | | | | 340/572.1 |
| 2011/0221575 | A1* | 9/2011 | Mincey | G06K 19/07749 |
| | | | | 340/10.3 |
| 2011/0248833 | A1* | 10/2011 | Ritamaki | G06K 19/0712 |
| | | | | 340/10.33 |
| 2013/0234836 | A1* | 9/2013 | Davis | G06F 21/31 |
| | | | | 340/10.5 |
| 2015/0187153 | A1* | 7/2015 | Davis | G06K 19/07336 |
| | | | | 340/5.52 |
| 2017/0127155 | A1* | 5/2017 | Zheng | G06K 7/10366 |
| 2017/0316235 | A1* | 11/2017 | Lee | G06K 7/10366 |
| 2019/0026114 | A1* | 1/2019 | Hayakawa | G06K 19/0723 |
| 2020/0125039 | A1* | 4/2020 | Shih | G04G 17/08 |
| 2020/0293850 | A1* | 9/2020 | Grove | G06K 19/07771 |

* cited by examiner

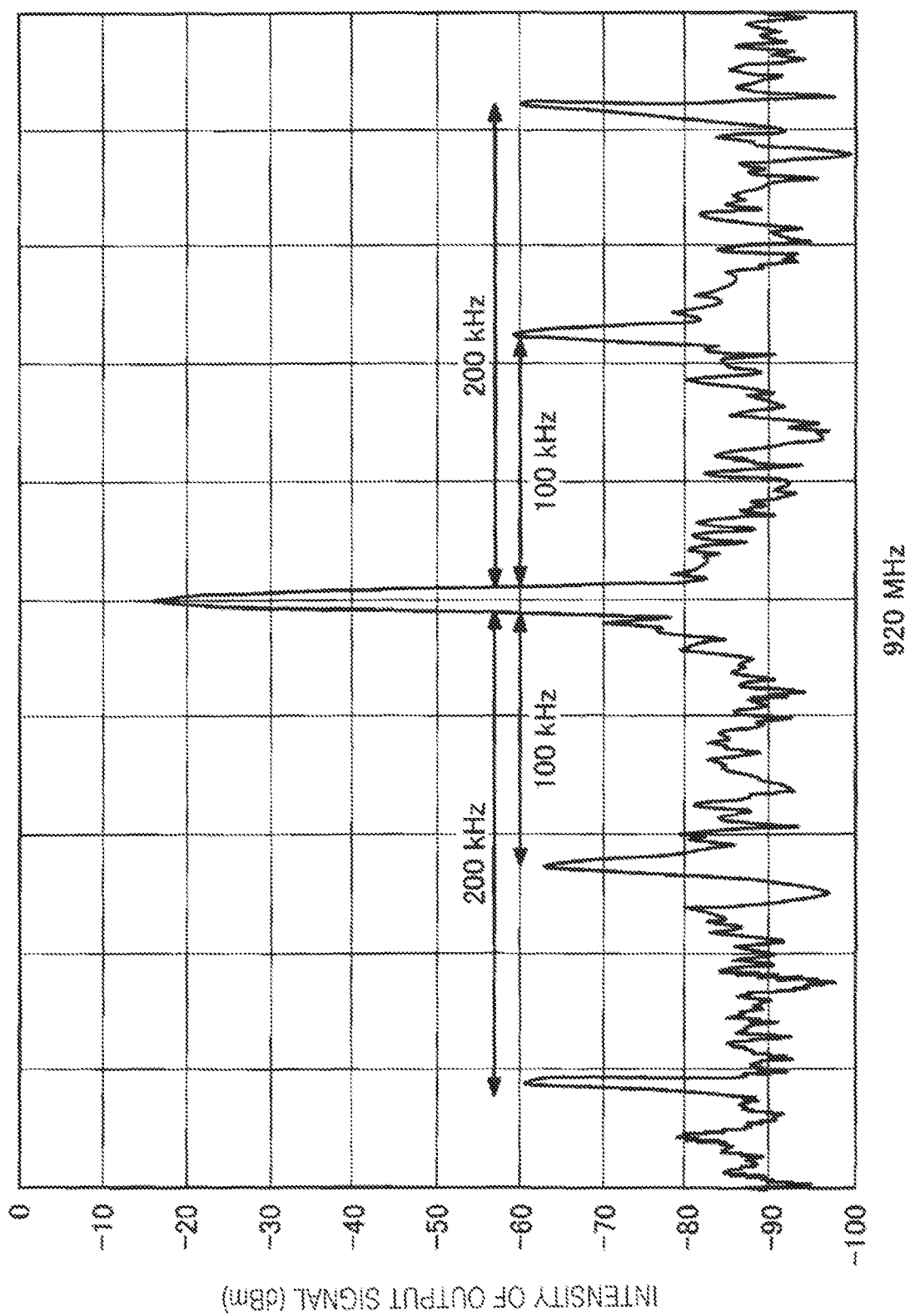

COMMUNICATION SYSTEM AND INFORMATION TERMINAL DEVICE

CLAIM OF PRIORITY

This application is a Continuation of International Application No. PCT/JP2020/011400 filed on Mar. 16, 2020, which claims benefit of Japanese Patent Application No. 2019-143048 filed on Aug. 2, 2019. The entire contents of each application noted above are hereby incorporated by reference.

BACKGROUND OF THE INVENTION

1. Field of the Invention

The present invention relates to a communication system and an information terminal device.

2. Description of the Related Art

Heretofore, there has been a passive wireless transponder having: an antenna, a rectifier, and a modulator that perform communication according to a backscattering principle to provide a radio-frequency identification (RFID) function; an oscillator that provides a modulation frequency to the modulator; and a sensing element that is connected to the oscillator, an oscillation frequency of the oscillator being dependent on the value of a predetermined variable sensed by the sensing element; and the oscillation frequency is a harmonic multiple N of the modulation frequency (for example, see Japanese Unexamined Patent Application Publication (Translation of PCT Application) No. 2018-517981).

Meanwhile, by utilizing a radio-frequency carrier wave signal transmitted from a reader, the passive wireless transponder of the related art operates and performs control to thereby transfer sensor data with a plurality of selectable backscattering modulation frequencies to the reader.

When functions as described above are implemented in a passive wireless transponder, which is a slave device having a sensor, the configuration of the slave device becomes complicated. In a system including a reader, which is a master device, and passive wireless transponders, which are slave devices, it is preferable that the configuration of the slave devices be simpler, particularly, when the number of slave devices is large.

SUMMARY OF THE INVENTION

Accordingly, the present invention provides a communication system in which the configuration of slave devices is more simplified and information terminal devices having a more simplified configuration.

The present invention provides a communication system that includes: a master device that is capable of transmitting a signal to a slave device; and a slave device that includes an antenna, a sensor unit, an RFID unit, a changeover switch that connects the antenna to one of the sensor unit and the RFID unit, and a switching circuit that switches the changeover switch based on a switching signal transmitted from the master device. When the antenna in the slave device receives the switching signal from the master device, the switching circuit switches the changeover switch in the slave device from a state in which the antenna and the sensor unit are connected to a state in which the antenna and the RFID unit are connected, in accordance with the switching signal.

BRIEF DESCRIPTION OF THE DRAWINGS

FIG. 5 is a graph showing one example of output signals of the BS circuits, the output signals being received by a control device.

DESCRIPTION OF THE PREFERRED EMBODIMENTS

A communication system and an information terminal device according to an embodiment of the present invention will be described below.

Embodiment

Figure 1:
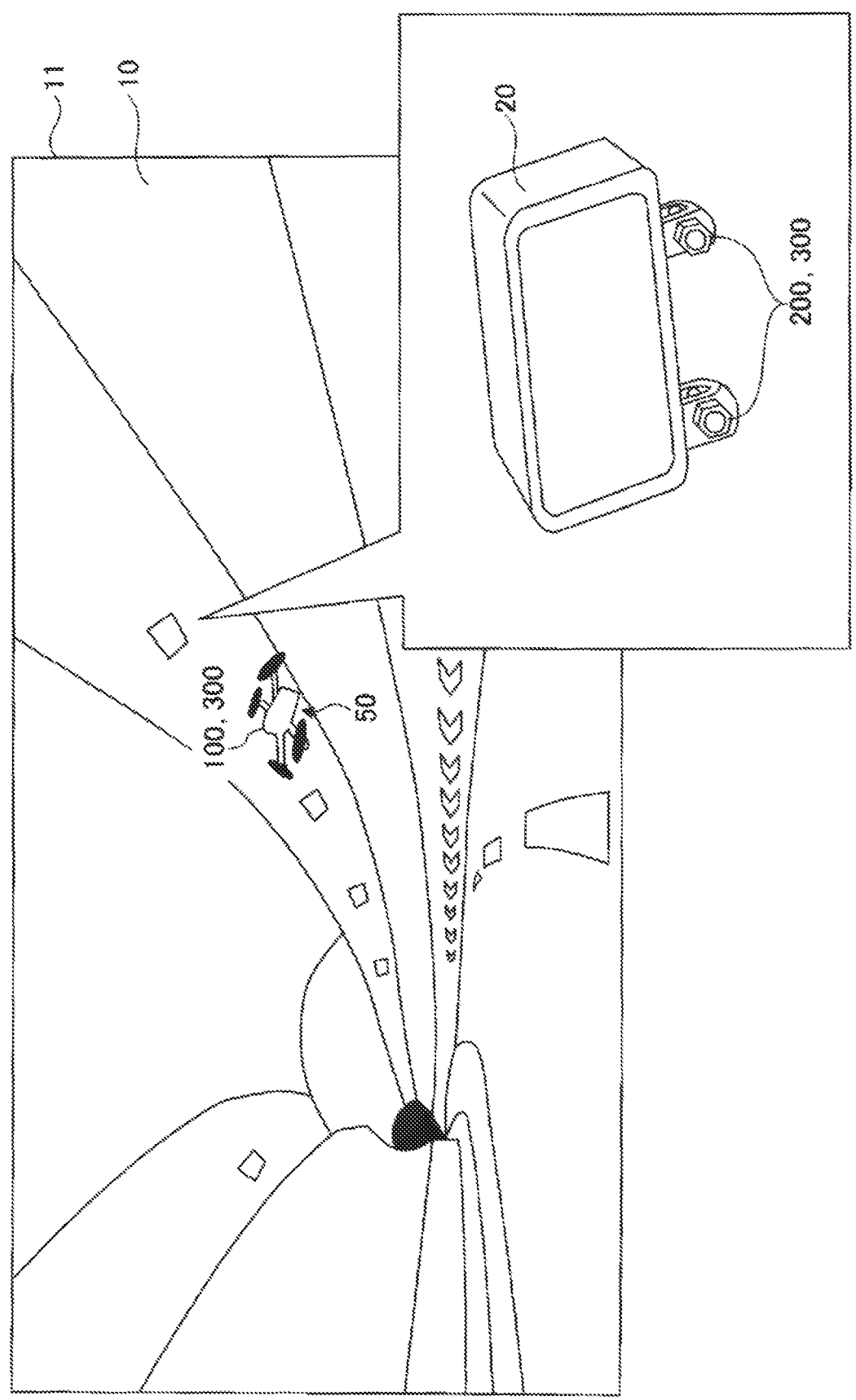
FIG. 1 is a view showing an application example of a communication system in an embodiment.

FIG. 1 is a view showing an application example of a communication system 300 in an embodiment. The communication system 300 includes a control device 100, which is a master device installed in a drone 50, and bolts 200, which are slave devices. Each bolt 200 is one example of an information terminal device and is used to secure a light 20 to an inner wall 11 of a tunnel 10 in one example.

Each bolt 200 includes a sensor and a radio-frequency Identification (RFID) chip. The sensor detects a state in which the bolt 200 is secured to the inner wall 11. The bolt 200 outputs a signal including a detection value of the sensor and a response signal including an identifier (ID) of the RFID chip. The output signal including the detection value and the output response signal are received by the control device 100, which is installed in the drone 50.

When the communication system 300 is applied to the tunnel 10 in the manner described above, a user of the communication system 300 operates a controller to steer the drone 50 to approach the light 20 and to cause the control device 100 to obtain the signal including the detection value and the response signal, the signals being output from the bolt 200.

Reading a level of the signal including the detection value makes it possible to check whether or not each bolt 200 is loosen. A large number of lights 20 are attached to the inner wall 11 of the tunnel 10, and a plurality of bolts 200 is attached to each light 20. Thus, a large number of bolts 200 are used in one tunnel 10.

The drone 50 performs radio communication with the controller. The drone 50 includes a control unit that controls rotational speeds of motors and so on in accordance with a command transmitted from the controller. This allows the drone 50 to fly freely in accordance with operations on the controller. Also, the control unit in the drone 50 is connected to the control device 100, installed in the drone 50, through a cable or the like so as to enable data communication therewith.

Figure 2:
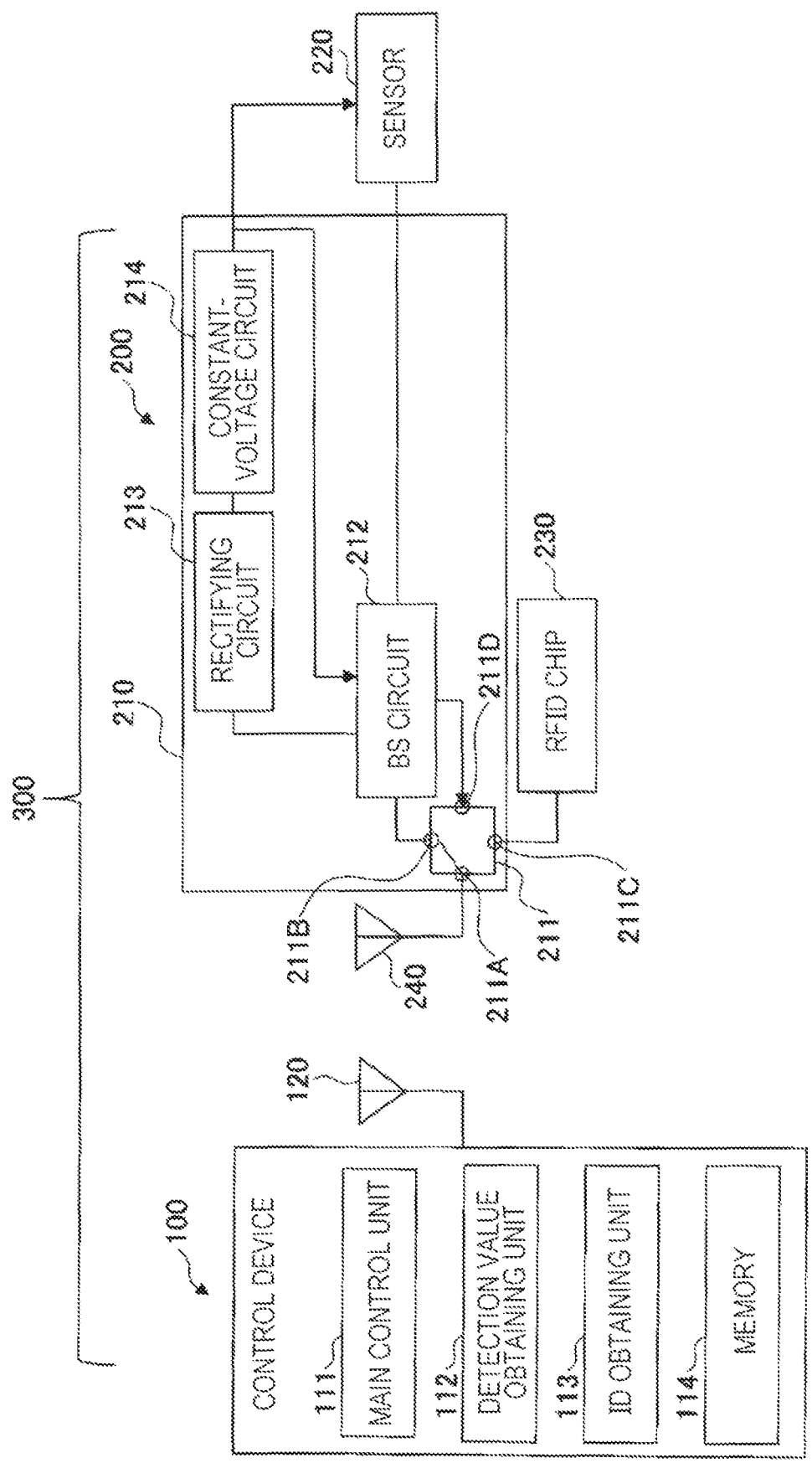
FIG. 2 is a diagram showing a configuration of the communication system.

FIG. 2 is a diagram showing a configuration of the communication system 300. FIG. 2 shows the control device 100 and one bolt 200.

The control device 100 has a main control unit 111, a detection value obtaining unit 112, an ID obtaining unit 113, a memory 114, and an antenna 120. The control device 100 is realized by a computer including a central processing unit (CPU), a random-access memory (RAM), a read-only memory (ROM), a hard disk drive (HDD), an input/output interface, an internal bus, and so on.

The main control unit 111, the detection value obtaining unit 112, and the ID obtaining unit 113 are shown as functional blocks representing functions of a program executed by the control device 100. Also, the memory 114 is a functional representation of a memory in the control device 100.

The main control unit 111 is a processing unit that performs comprehensive control on processing in the control device 100 and executes processing other than processing executed by the detection value obtaining unit 112 and the ID obtaining unit 113.

In order to obtain the detection value detected by the bolt 200, the detection value obtaining unit 112 controls transmission of a request signal, adjustment of transmission power, and so on.

In order to obtain the ID from the bolt 200, the ID obtaining unit 113 controls transmission of a switching signal, adjustment of transmission power of the switching signal, and so on.

The memory 114 stores the detection value obtained by the detection value obtaining unit 112, the ID obtained by the ID obtaining unit 113, and so on.

The antenna 120 is used for communication with the bolt 200.

Each bolt 200 has a circuit chip 210, a sensor 220, an RFID chip 230, and an antenna 240.

The circuit chip 210 has a changeover switch 211, a backscattering (BS) circuit 212, a rectifying circuit 213, and a constant-voltage circuit 214. In one example, the circuit chip 210 is a chip-type circuit incorporating the changeover switch 211, the BS circuit 212, the rectifying circuit 213, and the constant-voltage circuit 214, but does not necessarily have to be a chip type.

The changeover switch 211 is a three-terminal switch and has terminals 211A, 211B, and 211C. The changeover switch 211 further has an input terminal 211D to which the switching signal transmitted from the control device 100 is input. The terminals 211A, 211B, and 211C are connected to the antenna 240, the BS circuit 212, and the RFID chip 230, respectively.

In accordance with the switching signal, the changeover switch 211 connects the antenna 240 to one of the BS circuit 212 and the RFID chip 230. When the switching signal is at a low level, the changeover switch 211 connects the terminal 211A and the terminal 211B, that is, connects the antenna 240 and the BS circuit 212.

When the switching signal is switched to a high level, the changeover switch 211 connects the terminal 211A and the terminal 211C, that is, connects the antenna 240 and the RFID chip 230.

The switching signal is maintained at the low level, except in a particular state. Thus, the changeover switch 211 connects the antenna 240 and the BS circuit 212, except in the particular state. When the switching signal reaches the high level, this is synonymous with the circuit chip 210 receiving the switching signal for switching the target of connection of the antenna 240 from the BS circuit 212 to the RFID chip 230, the connection being performed by the changeover switch 211.

The changeover switch 211, the rectifying circuit 213, and the sensor 220 are connected to the BS circuit 212. When a request signal is received by the antenna 240 and is input to the BS circuit 212 via the changeover switch 211, the BS circuit 212 outputs the request signal to the rectifying circuit 213. As a result, the sensor 220 operates to output a sensor signal indicating the detection value to the BS circuit 212.

When the sensor signal is input to the BS circuit 212 from the sensor 220, the BS circuit 212 outputs a signal including the detection value indicated by the sensor signal to the changeover switch 211. The signal including the detection value is radiated from the antenna 240, and when the control device 100 is in a receivable range, the radiated signal is received by the control device 100. Details of the BS circuit 212 are described later.

The rectifying circuit 213 is a full-wave rectifying circuit provided between the BS circuit 212 and the constant-voltage circuit 214, performs full-wave rectification on the request signal output from the BS circuit 212, and outputs the rectified request signal to the constant-voltage circuit 214. Since the request signal is an alternating-current signal having a predetermined frequency, the request signal is subjected to the full-wave rectification by the rectifying circuit 213 and is output to the constant-voltage circuit 214.

The constant-voltage circuit 214 is a smoothing circuit that smooths power subjected to the full-wave rectification by the rectifying circuit 213. Direct-current power resulting from the smoothing by the constant-voltage circuit 214 is supplied to the BS circuit 212 and the sensor 220 as power for operation. For example, the constant-voltage circuit 214 can be implemented by a smoothing capacitor. The constant-voltage circuit 214 functions as a smoothing capacitor and also functions as a power source for supplying accumulated power to the sensor 220 and the BS circuit 212.

A power input terminal of the sensor 220 is connected to the constant-voltage circuit 214, and an output terminal of the sensor 220 is connected to the BS circuit 212. When the power is input to the sensor 220 from the constant-voltage circuit 214, the sensor 220 starts up to output a detection signal indicating the detection value to the BS circuit 212. The sensor 220 is, for example, a pressure sensor enclosed in the bolt 200. For example, the pressure sensor can be implemented by a pressure sensor including a semiconductor pressure sensor utilizing a piezoresistive effect.

When the bolt 200 and a nut are fastened, with a member, interposed therebetween, for attaching the light 20 to the inner wall 11, the bolt 200 is extended in axial directions, so that the volume of internal space in which the sensor 220 is enclosed increases, and the pressure in the internal space decreases.

Also, in a state in which the bolt 200 and the nut are fastened, with a member, interposed therebetween, for securing the light 20 to the inner wall 11, when the bolt 200 and the nut are loosen relatively, the force of pulling the bolt 200 in the axial directions decreases, so that the amount of the extension decreases. As a result, the volume of the internal space in which the sensor 220 is enclosed decreases, and the pressure therein increases. When such a pressure increase or decrease is detected, it is possible to detect loosening of the bolt 200 and the nut, the loosing being associated with elapse of time.

The RFID chip 230 is an integrated circuit (IC) chip for an RFID tag and stores a unique ID in an internal memory. The RFID chip 230 is a passive RFID chip having no power source therein.

When the changeover switch 211 connects the antenna 240 and the RFID chip 230, the RFID chip 230 starts up with power of a signal received by the antenna 240 and outputs the response signal including the ID. The response signal is radiated by the antenna 240, and when the control device 100 is present at a receivable position, the response signal is received by the control device 100.

The signal that provides the startup power for the RFID chip 230 is a high-level switching signal for switching the target of connection of the antenna 240 from the BS circuit 212 to the RFID chip 230, the connection being performed by the changeover switch 211.

Figure 3:
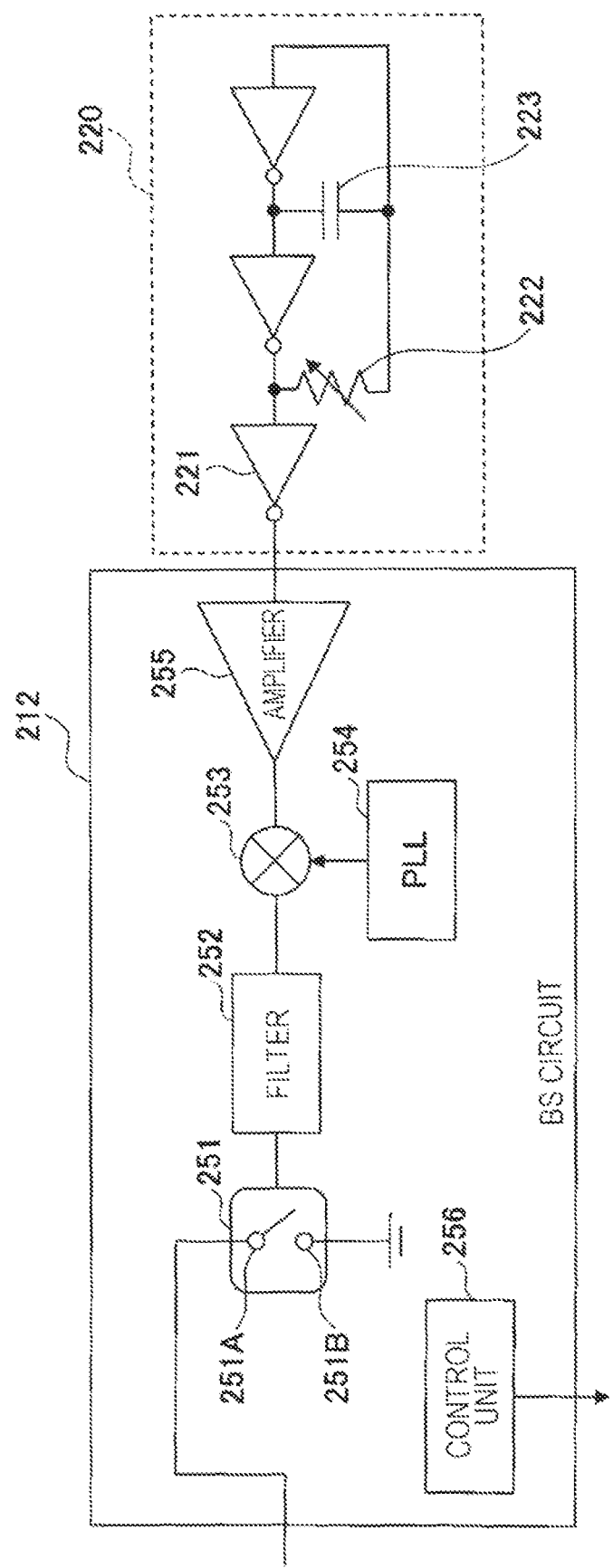
FIG. 3 is a diagram showing configurations of a BS circuit and a sensor.

FIG. 3 is a diagram showing configurations of the BS circuit 212 and the sensor 220.

The BS circuit 212 has a switch 251, a filter 252, a mixer 253, a phase locked loop (PLL) 254, an amplifier 255, and a control unit 256.

The switch 251 is a two-terminal switch and performs on/off switching in accordance with an output of the filter 252. For example, the switch 251 can be implemented by a field-effect transistor (FET). One terminal 251A of the switch 251 is connected to the terminal 211B of the changeover switch 211, and another terminal 251B of the switch 251 is connected to ground.

The filter 252 is a low-pass filter (LPF) provided between a control terminal of the switch 251 and the mixer 253. A signal having a predetermined frequency is input to the filter 252 from the mixer 253. The predetermined frequency is, for example, 920 MHz. The filter 252 blocks frequency components higher than a frequency band including the predetermined frequency. The filter 252 is provided in order to block harmonics of the signal having the predetermined frequency.

The mixer 253 superimposes an amplified sensor signal, output from an output terminal of the amplifier 255, on a carrier wave output from an output terminal of the PLL 254 and outputs the resulting sensor signal.

The PLL 254 outputs the carrier wave, which has a predetermined frequency, for transmitting the amplified sensor signal. The frequency of the carrier wave is, for example, 920 MHz.

The amplifier 255 amplifies the sensor signal output from the sensor 220 and outputs the amplified sensor signal to the mixer 253.

The control unit 256 is one example of a switching circuit for switching the changeover switch 211 (see FIG. 2). The control unit 256 is, for example, a microcomputer, and an output terminal thereof is connected to the input terminal 211D of the changeover switch 211.

When the high-level switching signal is input to the BS circuit 212 via the changeover switch 211, the control unit 256 starts up to switch the target of connection of the antenna 240 to the RFID chip 230, the connection being performed by the changeover switch 211. A period in which the switching signal is at the high level is a predetermined period that is sufficient for the RFID chip 230 to perform an operation for outputting the response signal including the ID. When the predetermined period elapses, the level of the switching signal changes to the low level. When the switching signal returns to the low level, the control unit 256 switches the target of connection of the antenna 240 from the RFID chip 230 to the BS circuit 212, the connection being performed by the changeover switch 211.

In one example, the sensor 220 has a configuration of a resonant circuit having three inverters 221, a variable resistor 222, and a capacitor 223. The three inverters 221 are connected in series. Herein, the three inverters 221 are referred to as a "first stage", a "middle stage", and a "last stage" from the right side. An output terminal of the inverter 221 at the first stage is connected to an input terminal of the inverter 221 at the middle stage and is also connected to an input terminal of the inverter 221 at the first stage via the capacitor 223.

Also, an output terminal of the inverter 221 at the middle stage is connected to an input terminal of the inverter 221 at the last stage. Also, the output terminal of the inverter 221 at the middle stage is connected to an input terminal of the inverter 221 at the middle stage via the variable resistor 222 and the capacitor 223 and is also connected to an input terminal of the inverter 221 at the first stage via the variable resistor 222.

The variable resistor 222 is a semiconductor pressure sensor utilizing the piezoresistive effect, as described above, and a resistance value thereof varies according to a change in the pressure in the internal space of the bolt 200. The electrostatic capacitance of the capacitor 223 has a fixed value.

In such a sensor 220, the resistance value of the variable resistor 222 varies according to a change in the pressure in the internal space of the bolt 200, and thus, when the sensor 200 starts up upon supply of power of the request signal, it outputs a sensor signal having a resonant frequency according to a time constant determined by the resistance value of the variable resistor 222 and the electrostatic capacitance of the capacitor 223.

The sensor signal is amplified by the amplifier 255, and in the mixer 253, the amplified sensor signal is superimposed on the carrier wave output from the PLL 254, harmonic components are removed from the sensor signal by the filter 252, and the resulting sensor signal is input to the control terminal of the switch 251. As a result, the on and off states of the switch 251 are switched therebetween according to a frequency of a signal output from the filter 252. An output of the switch 251 is the signal including the detection value and is radiated from the antenna 240 via the changeover switch 211 as an output signal of the BS circuit 212.

Figures 4A, 4B, 4C:
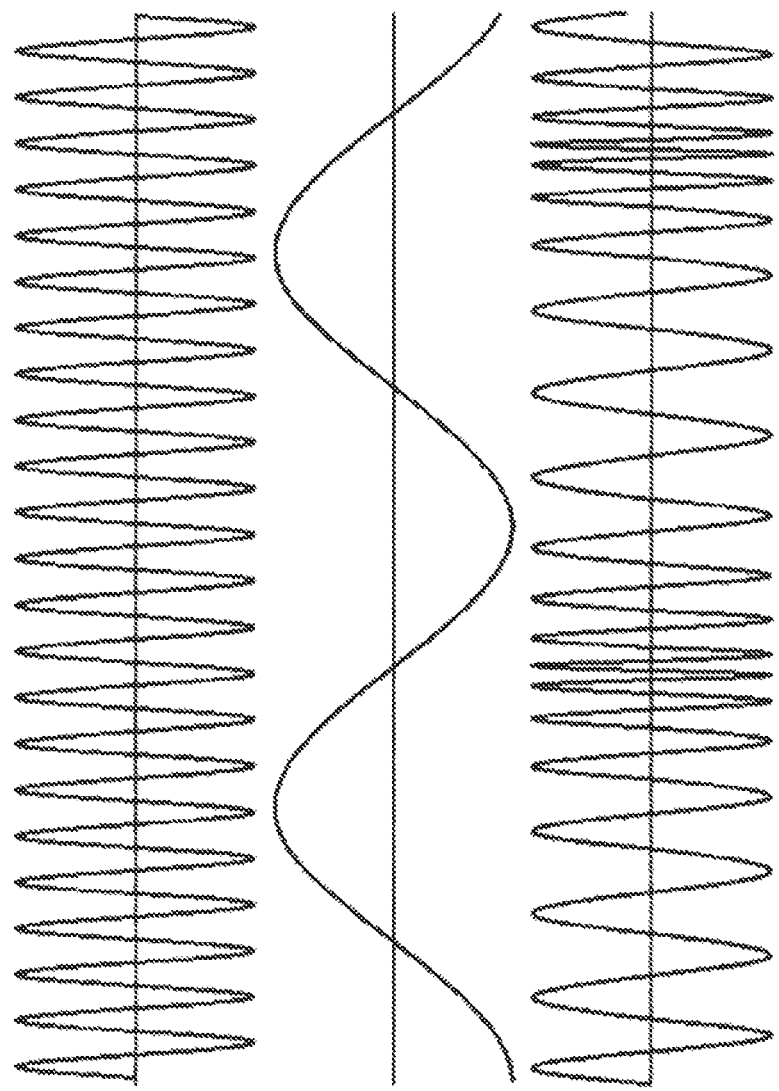
FIG. 4A is a diagram showing a waveform of a carrier wave.
FIG. 4B is a diagram showing a sensor signal.
FIG. 4C is a diagram showing a signal resulting from superimposition of the sensor signal on the carrier wave.

FIG. 4A is a diagram showing a waveform of a carrier wave, FIG. 4B is a diagram showing a sensor signal, and FIG. 4C is a diagram showing a signal resulting from superimposition of the sensor signal on the carrier wave. In one example, when the carrier wave is 920 MHz, a time constant of the resonance circuit in the sensor 220 is set so that the frequency of the sensor signal becomes a frequency of about 100 kHz to about 1 MHz (from about 1/1000 to about 1/10000 of the carrier wave).

In one example, when a 100 kHz sensor signal shown in FIG. 4B is superimposed on the 920 MHz carrier wave shown in FIG. 4A, a superimposed signal shown in FIG. 4C is obtained. The superimposed signal is a signal obtained by modulating the phase of the carrier wave with the sensor signal. The superimposed signal is input to the control terminal of the switch 251 from the filter 252.

FIG. 5 is a graph showing one example of output signals of the BS circuits 212, the output signals being received by the control device 100. FIG. 5 shows one example of a waveform when the control device 100 receives output signals of the BS circuits 212 from two bolts 200.

Since the resistance value of the variable resistor 222 in each sensor 220 varies according to the pressure in the internal space of the bolt 200, the resonant frequency of the sensor signal varies according to the pressure in the internal space of the bolt 200.

In FIG. 5, the output signal of the BS circuit 212, the output signal being received from one bolt 200, is adapted to have peaks at about 100 kHz before and after the 920 MHz carrier wave, and the output signal of the BS circuit 212, the output signal being received from another bolt 200, is adapted to have peaks at about 200 kHz before and after the 920 MHz carrier wave.

Figure 6:
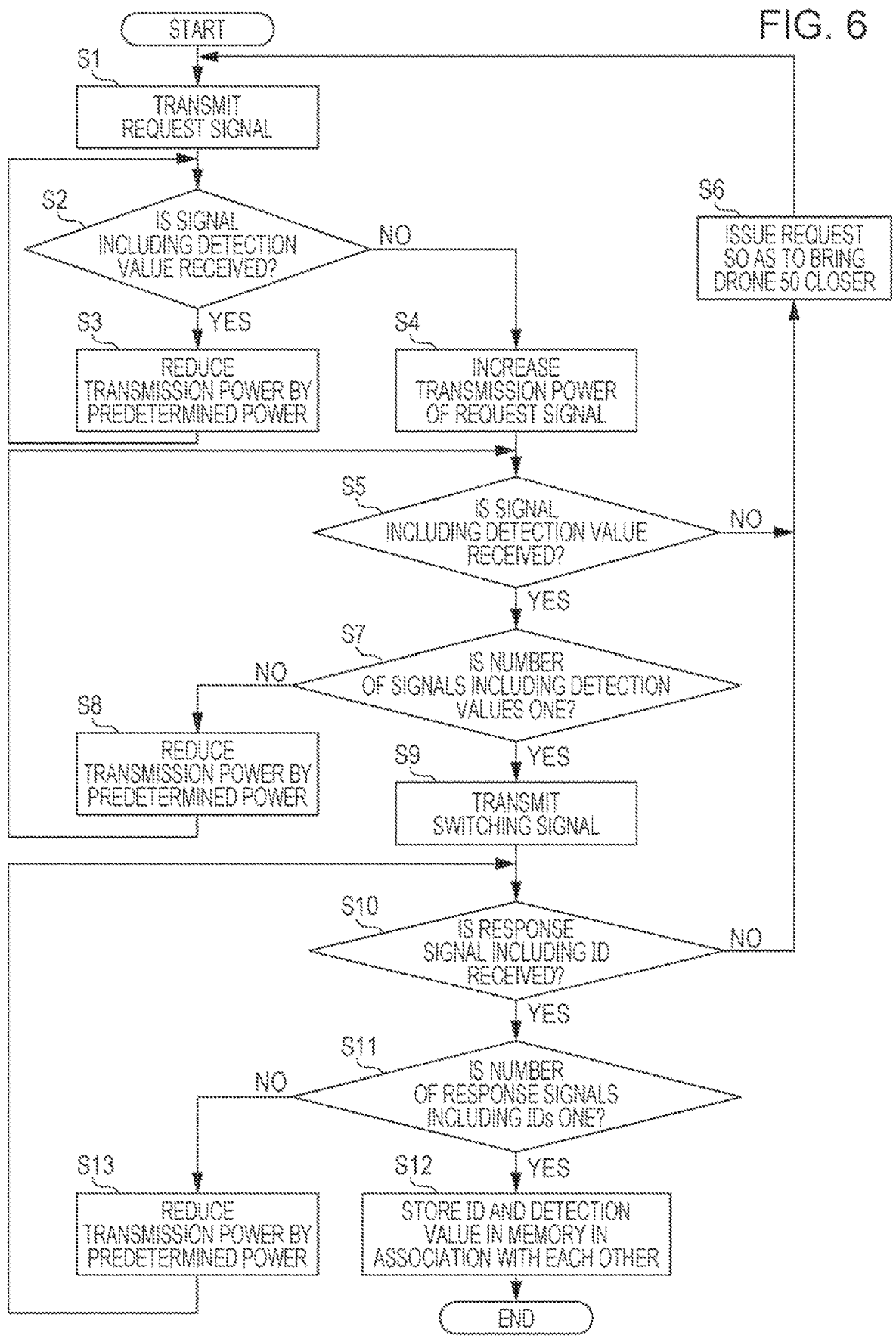
FIG. 6 is a flowchart showing processing executed by the control device.

FIG. 6 is a flowchart showing processing executed by the control device 100.

The user steers the drone 50 by using the controller, and when the drone 50 comes close to the inner wall 11 of the tunnel 10 to a certain degree, the control device 100 starts the processing (START).

The detection value obtaining unit 112 transmits a request signal with predetermined transmission power (step S1). The request signal is transmitted to unspecified bolts 200. As a result, each bolt 200 that receives the request signal outputs a signal including a detection value.

The detection value obtaining unit 112 determines whether or not a signal including a detection value is received from any of the bolts 200 (step S2).

Upon determining that a signal including a detection value is received (YES in S2), the detection value obtaining unit 112 reduces the transmission power of the request signal by a predetermined power (step S3).

On the other hand, upon determining in step S2 that a signal including a detection value is not received (NO in S2), the detection value obtaining unit 112 increases the transmission power of the request signal to a predetermined power used before it was reduced in the process in steps S3 (step S4).

The detection value obtaining unit 112 determines whether or not a signal including a detection value is received from any of the bolts 200 (step S5). This determination is made in order to check whether the reception can be performed again using the transmission power with which it was determined in step S2 that the last reception was performed.

When the detection value obtaining unit 112 determines that a signal including a detection value is not received (NO in S5), the main control unit 111 advances the flow to step S6 and requests the control unit in the drone 50 so as to bring the drone 50 closer to any of the bolts 200 (step S6). As a result, the control unit in the drone 50 performs display or the like for requesting the controller so as to bring the drone 50 closer to any of the bolts 200.

Upon determining in step S5 that a signal including a detection value is received (YES in S5), the detection value obtaining unit 112 determines whether or not the number of signals including detection values is one (step S7). For example, when the number of signals including detection values is two, two peaks that are offset from the peak of the carrier wave by amounts corresponding to the resonant frequencies of the sensors 220 are obtained at each of two opposite sides of the peak of the carrier wave, as shown in FIG. 5. Thus, in step S7, it is sufficient to determine whether or not there is one peak at each of the two opposite sides of the peak of the carrier wave.

Upon determining that the number of signals including detection values is not one (NO in S7), the detection value obtaining unit 112 reduces the transmission power of the request signal by a predetermined power (step S8). This power reduction is performed in order to bring the situation into a situation in which the number of signals including detection values becomes one.

When the detection value obtaining unit 112 determines in step S7 that the number of signals including detection values is one (YES in S7), the ID obtaining unit 113 transmits a switching signal, with transmission power being held at the transmission power set for the request signal in step S4 (step S9).

The ID obtaining unit 113 determines whether or not a response signal including an ID is received from any of the bolts 200 (step S10).

Upon determining that a response signal including an ID is received from any of the bolts 200 (YES in S10), the ID obtaining unit 113 determines whether or not the number of response signals including IDs is one (step S11).

When the ID obtaining unit 113 determines that the number of response signals including IDs is one (YES in S11), the main control unit 111 stores the ID, included in the received response signal, and the detection value, included in the signal for which it was determined in step S7 that the number thereof is one, in the memory 114 in association with each other (step S12).

Thereafter, the control device 100 ends the series of processes (END).

When the ID obtaining unit 113 determines in step S10 that a response signal including an ID is not received from any of the bolts 200 (NO in S10), the main control unit 111 returns the flow to step S6. This is to issue a request for bringing the drone 50 closer to any of the bolts 200.

Also, upon determining in step S11 that the number of response signals including IDs is not one (NO in S11), the ID obtaining unit 113 reduces the transmission power of the switching signal by a predetermined power (step S13). This power reduction is performed in order to bring the situation into a situation in which a response signal including an ID is received from one bolt 200.

As described above, when each bolt 200 receives the request signal from the control device 100, the circuit chip 210 operates with the power of the request signal to obtain a sensor signal indicating a detection value of the sensor 220, the BS circuit 212 outputs a signal including the detection value, and the signal is radiated from the antenna 240.

The control device 100 reduces the transmission power until the number of bolts 200 that transmit signals including detection values in response to the request signal becomes one. Each signal including the detection value exhibits, at two opposite sides of the peak of the carrier wave, peaks that are offset by an amount corresponding to the resonant frequency of the sensor 220, as shown in FIG. 5. The control device 100 obtains the signal including the detection value from one bolt 200 and extracts the detection value of the sensor 220 from the signal including the detection value.

The control device 100 then transmits a switching signal, with the number of communication targets being narrowed down to one bolt 200. When one bolt 200 receives the switching signal, the changeover switch 211 switches into a state in which the antenna 240 and the RFID chip 230 are connected, so that the RFID chip 230 operates with the power of the switching signal to output the response signal including the ID, and the response signal including the ID is radiated from the antenna 240.

Upon obtaining the response signal including the ID from the bolt 200 from which the signal including the detection value was received, the control device 100 stores the detection value and the ID in the memory 114 in association with each other. This allows the control device 100 to obtain the detection value, detected by the sensor 220 in one bolt 200, and the ID in association with each other.

In such a series of processes, each bolt 200 merely operates in response to the request signal and the switching signal transmitted from the control device 100, and the control device 100 performs control for narrowing down the number of bolts 200 that become communication targets to one and control for obtaining the response signal including the ID from the bolt 200.

Accordingly, it is possible to provide the communication system 300 in which the configuration of the bolts 200 (slave devices) is more simplified and the bolts 200 having a more simplified configuration.

Also, since each bolt 200 operates with the power of the request signal to radiate the signal including the detection value and operates with the power of the switching signal to radiate the response signal including the ID, the bolt 200 does not need to include a power source, such as a battery. In this respect, it is also possible to simplify the configuration of the bolts 200 (slave devices).

Also, since the circuit chip 210 in each bolt 200 includes the BS circuit 212, the detection value of the sensor 220 can be processed in an analog manner without being subjected to processing, such as digital conversion, and can be passed to the control device 100. In this respect, it is also possible to simplify the configuration of the bolts 200 (slave devices).

Although a mode in which the sensor 220 is provided in each bolt 200 (slave device), and the control device 100 (master device) installed in the drone 50 obtains the detection value and the ID has been described above, each slave device in which the sensor 220 and the RFID chip 230 are provided is not limited to the bolt 200, and the present invention is not limited to modes in which the control device 100, which is a master device, is installed in the drone 50. The sensors 220 and the RFID chips 230 can be provided in various types of slave device, and a control device 100 having various types of form can be adapted to obtain the detection values and the IDs.

Also, the description above has been given of a mode in which the circuit chip 210 and the RFID chip 230 are separate units in each bolt 200. When the circuit chip 210 and the RFID chip 230 are made as separate units in such a manner, there are cases in which procurement cost can be reduced. The circuit chip 210 and the RFID chip 230 may be configured as a single chip.

Although the communication system and the information terminal devices in the exemplary embodiment of the present invention have been described above, the present invention is not limited to the specifically disclosed embodiment, and various modifications and changes can be made thereto without departing from the scope of the appended claims.

What is claimed is:

1. A communication system comprising:
a master device configured to transmit a signal to a slave device; and
the slave device including an antenna, a sensor, a radio-frequency identification device, a changeover switch that connects the antenna to one of the sensor and the radio-frequency identification device, and a switching circuit that is configured to switch the changeover switch based on a switching signal transmitted from the master device,
wherein, when the antenna in the slave device receives the switching signal from the master device, the switching circuit is configured to switch the changeover switch in the slave device from a state in which the antenna and the sensor are connected to a state in which the antenna and the radio-frequency identification device are connected, in accordance with the switching signal,
the slave device further includes a backscattering circuit provided between the changeover switch and the sensor,
the changeover switch is configured to switch between a state in which the antenna is connected to the sensor via the backscattering circuit and a state in which the antenna is connected to the radio-frequency identification device,
in the state in which the changeover switch in the slave device connects the antenna to the sensor via the backscattering circuit, when the antenna in the slave device receives a request signal from the master device, a signal including a detection value output by the sensor is transmitted from the antenna to the master device via the backscattering circuit, and
when the master device receives signals including detection values from a plurality of the slave devices, the master device reduces transmission power of the request signal until a state in which the signal including the detection value is received from one of the slave devices is reached.

2. The communication system according to claim 1, wherein the sensor and the backscattering circuit operate using power of the request signal received by the antenna.

3. The communication system according to claim 1, wherein, when the changeover switch is switched to the state in which the antenna and the radio-frequency identification device are connected, the radio-frequency identification device is configured to output a signal including identification information via the antenna.

* * * * *